(12) United States Patent
Unsworth

(10) Patent No.: US 7,192,226 B2
(45) Date of Patent: Mar. 20, 2007

(54) SHRINK FIT HOLDER AND METHODS OF DRILLING AND REAMING

(75) Inventor: Robert Unsworth, Bolton (GB)

(73) Assignee: Industrial Tooling Corporation Limited, Tamworth (GB)

( * ) Notice: Subject to any disclaimer, the term of this patent is extended or adjusted under 35 U.S.C. 154(b) by 0 days.

(21) Appl. No.: 10/871,678

(22) Filed: Jun. 15, 2004

(65) Prior Publication Data

US 2004/0258494 A1     Dec. 23, 2004

(30) Foreign Application Priority Data

Jun. 17, 2003   (GB)   ................................. 0313976.3

(51) Int. Cl.
    *B23B 51/00* (2006.01)
(52) U.S. Cl. .................. 409/136; 408/1 R; 408/56; 408/226; 279/8; 279/145
(58) Field of Classification Search ................ 408/144, 408/226, 238, 239 A, 239 R, 702, 1 R, 56, 408/57, 59; 409/232, 234, 136, 137; 279/8, 279/143, 145
    See application file for complete search history.

(56) References Cited

U.S. PATENT DOCUMENTS

| | | | |
|---|---|---|---|
| 3,097,571 A | | 7/1963 | Kaman |
| 3,208,722 A | | 9/1965 | Rodriquez et al. |
| 3,583,383 A | * | 6/1971 | Ovshinsky .................... 125/20 |
| 3,678,632 A | * | 7/1972 | Eversole et al. ............ 451/342 |
| 3,797,583 A | | 3/1974 | Quackenbush |
| 4,090,804 A | * | 5/1978 | Haley .......................... 408/59 |
| 4,258,798 A | * | 3/1981 | Campbell et al. ........... 173/168 |
| 4,273,344 A | * | 6/1981 | Benson et al. ................ 279/75 |
| 4,643,621 A | * | 2/1987 | Fuller et al. .................. 408/57 |
| 4,743,145 A | * | 5/1988 | Hendricks et al. ............ 408/59 |
| 4,749,316 A | * | 6/1988 | Hendricks ............... 408/239 R |
| 4,752,161 A | * | 6/1988 | Hill .............................. 408/67 |
| 4,764,060 A | * | 8/1988 | Khurana ....................... 408/14 |
| 4,818,161 A | * | 4/1989 | Cook ......................... 409/233 |
| 5,048,375 A | * | 9/1991 | Kobayashi ................. 76/108.6 |
| 5,067,861 A | * | 11/1991 | Danielsen .................. 279/4.03 |
| 5,074,025 A | * | 12/1991 | Willard, III .................. 29/505 |
| 5,092,717 A | * | 3/1992 | Fischer ........................ 408/59 |
| 5,116,172 A | * | 5/1992 | Koster ........................ 408/226 |
| 5,137,398 A | * | 8/1992 | Omori et al. ............... 408/145 |
| 5,160,229 A | * | 11/1992 | Yoshino ...................... 408/59 |
| 5,199,831 A | * | 4/1993 | Broucksou ................ 408/72 R |
| 5,281,056 A | * | 1/1994 | Lawson et al. ............. 408/1 R |
| 5,311,654 A | * | 5/1994 | Cook .......................... 29/447 |

(Continued)

FOREIGN PATENT DOCUMENTS

DE         2427257 A1      1/1976

(Continued)

*Primary Examiner*—Monica Carter
*Assistant Examiner*—Michael W. Talbot
(74) *Attorney, Agent, or Firm*—Bracewell & Giuliani LLP

(57) ABSTRACT

A drill has a unitary drill bit and chuck structure that includes a drill bit and a chuck. The chuck encloses a portion of the drill bit and has a thread. A rotatable drive element having a thread engages the thread of the chuck. The chuck is heat shrunk onto the drill bit to form a unitary structure through direct bonding of the chuck with the drill bit.

15 Claims, 6 Drawing Sheets

U.S. PATENT DOCUMENTS

| | | | | |
|---|---|---|---|---|
| 5,347,765 A * | 9/1994 | Mixon, Jr. | ................... | 451/28 |
| 5,601,386 A * | 2/1997 | Wells | .......................... | 408/57 |
| 5,704,383 A * | 1/1998 | Kammeraad et al. | .... | 137/15.14 |
| 5,716,170 A | 2/1998 | Kammermeier et al. | | |
| 5,829,926 A | 11/1998 | Kammermeier et al. | | |
| 5,947,657 A * | 9/1999 | Lipohar et al. | ............... | 408/97 |
| 6,158,304 A * | 12/2000 | Packer et al. | .............. | 76/104.1 |
| 6,260,858 B1 * | 7/2001 | DeLucia | ..................... | 279/102 |
| 6,339,868 B1 * | 1/2002 | Nagaya et al. | ................ | 29/447 |
| 6,352,127 B1 * | 3/2002 | Yorde | ......................... | 173/216 |
| 6,394,466 B1 * | 5/2002 | Matsumoto et al. | ........ | 279/103 |
| 6,425,716 B1 * | 7/2002 | Cook | .......................... | 408/145 |
| 6,511,077 B1 * | 1/2003 | Voss et al. | .................. | 279/102 |
| 6,558,089 B2 * | 5/2003 | DeBlasio | ............... | 408/239 A |
| 6,595,528 B2 * | 7/2003 | Voss | ........................... | 279/102 |
| 6,601,857 B1 * | 8/2003 | Richmond | .................. | 279/20 |
| 6,729,809 B2 * | 5/2004 | Sarh et al. | ................... | 408/1 R |
| 6,871,859 B2 * | 3/2005 | Lundblad et al. | ........... | 279/102 |
| 2002/0054798 A1 * | 5/2002 | Dils et al. | ................... | 408/124 |
| 2003/0002940 A1 * | 1/2003 | Forth et al. | ................. | 408/226 |
| 2003/0088972 A1 | 5/2003 | Haimer | | |

FOREIGN PATENT DOCUMENTS

| | | |
|---|---|---|
| DE | 3011221 A1 | 10/1981 |
| DE | 248761 A1 | 8/1987 |
| DE | 19638808 A1 | 3/1998 |
| DE | 20107664 U1 | 8/2001 |
| EP | 1004378 A | 5/2000 |
| EP | 1488876 A2 * | 12/2004 |
| GB | 2214453 A * | 9/1989 |
| JP | 2001129728 A | 11/1999 |

* cited by examiner

SHRINK FIT HOLDER AND METHODS OF DRILLING AND REAMING

RELATED APPLICATIONS

This application claims the benefit of United Kingdom Patent Application No. 0313976.3, filed on Jun. 17, 2003, which hereby is incorporated by reference in its entirety.

1. Field of the Invention

This invention relates to novel drills and methods of drilling, in particular to a unitary drill bit and chuck structure, and to drills incorporating same.

2. Description of the Prior Art

The manufacture of extremely large objects presents certain problems. Examples of extremely large objects include numerous components utilised in the aeronautical industry, such as air frames and wings. It is frequently necessary to perform drilling or reaming operations on such large objects, but, clearly, it is not possible to utilise large and essentially immovable devices such as machine tools for these purposes. Thus, handheld drilling devices which are readily portable by a person over a relatively large area are utilised. Typically handheld air drills are utilised using portable jigs, these devices being provided with a flexible line that supplies pressurised air in order to drive the motor. An example of such a prior art air drill is shown in FIG. 1, which depicts an air drill (generally shown at 10) comprising a pressurised air line 12, and air motor 14, and a rotating shaft 16. The shaft 16 has a thread (not shown) onto which is threaded an adaptor section 18 which carries a drill bit 20 (the drill bit 20 only partially being shown in FIG. 1).

FIG. 2 shows a prior art drill bit in more detail, the Figure depicting a drill bit 22 in connection with a threaded adaptor 24. Prior art drill bit threaded adaptor combinations for use with air drills of the type described above are manufactured by brazing the drill bit in place on the threaded adaptor. FIG. 2 shows a V braze (shown as 26) permitting connection of the drill bit 22 with the threaded adaptor 24. There are a number of problems and drawbacks associated with the prior art technique of brazing the drill bit into the threaded adaptor. It is expensive to manufacture threaded adaptor/drill bit structures using this technique. Furthermore, the structural integrity of the fitting is not as sound as would be desirable, owing to potential failure of the braze. Further still, post treatment of the fitting is required in order to ensure concentricity. In applications such as air frame manufacturing, it is common for very abrasive composite materials, such as carbon fibre and aluminium laminated components, to be used. Such components require the use of a very hard drill, and typically carbide drills are employed. It would be desirable to utilise a diamond coated drill bit, but to date this has not been possible owing to the high temperatures involved in the diamond coating process which would cause the brazing on prior art threaded adaptor/drill bit structures to fail.

It is known in machine tool drilling to shrink fit a grip onto a cutter. The grip/cutter combination formed is inserted into and gripped by the spindle of the machine tool. It is noted that such devices are large, substantially immovable, and certainly cannot be conveniently transported by hand over a wide area in order to work on extremely large objects such as air frames and wings. Furthermore, such machine tool drills do not involve threaded connection between the machine tool itself and the grip which carries the cutter. Thus, such machine tools do not address the problems discussed above in respect of handheld air drills, and certainly would not represent a practical solution.

SUMMARY OF THE INVENTION

In contrast, the present invention solves the abovenamed problems. For the avoidance of doubt, it is understood that the terms "unitary drill bit and chuck structure" and "drill", as used below, include within their scope reaming devices. Also, it is understood that the term "handheld drill" includes within its scope drills that are held on portable jigs during drilling operations, but nonetheless are readily portable between different drilling locations by way of being carried by hand.

According to a first aspect of the invention there is provided a unitary drill bit and chuck structure comprising a drill bit and a chuck enclosing a portion of the drill bit and having a thread located thereon to permit attachment of the unitary drill bit and chuck structure to a drilling device. The chuck is heat shrunk onto the drill bit, thereby forming the unitary structure through direct bonding of the chuck with the drill bit.

The unitary structure of the present invention is economical and convenient to produce, structurally sound, able to withstand high temperatures, and capable of being coated with a variety of abrasive materials. The thread can be produced in various thread sizes, which can be metric or imperial. The chuck can have a bore in which the drill bit is located, and this bore can be of various diameters in order to accommodate a range of shank diameters on the drill bit.

The chuck may comprise a precipitation hardening steel. The drill bit may be formed from a carbide containing material. The drill bit may be formed from tungsten carbide. The drill bit may be diamond coated.

According to a second aspect of the invention there is provided a drill comprising a unitary drill bit and chuck structure according to the first aspect of the invention. A rotatable drive element has a thread located thereon. A drive means rotates said rotatable drive element. The unitary drill bit and chuck structure is in threaded engagement with the rotatable drive element.

The drill may be handheld. In this instance the drive means may comprise an air motor, and the drill may further comprise a pressurised airline for supplying pressurised air to the air motor.

According to a third aspect of the invention there is provided a method of manufacturing a unitary drill bit and chuck structure comprising the steps of providing a drill bit, providing a chuck formed from a heat shrinkable material, heating the chuck to a predetermined temperature, introducing a portion of the drill bit into the chuck. The chuck is allowed to cool so as to heat shrink the chuck into direct bonding contact with the drill bit, thereby producing a unitary drill bit and chuck structure. A thread is provided on the chuck, and the step of providing a thread on the chuck may be performed before the step of introducing a portion of the drill bit into the chuck.

BRIEF DESCRIPTION OF THE DRAWINGS

Unitary drill bit and chuck structures, drills incorporating same, and methods of manufacturing unitary drill bit and chuck structures will now be described with reference to the accompanying drawings, in which:—

DETAILED DESCRIPTION OF THE PREFERRED EMBODIMENTS

Figure 1:
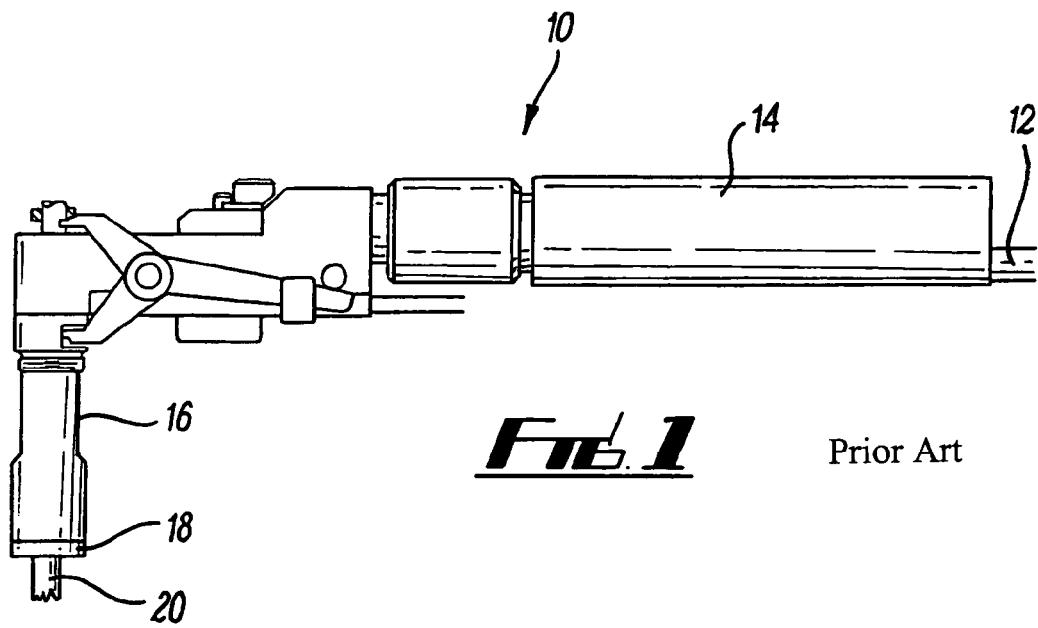
FIG. 1 shows a prior art air drill.
Figure 2:
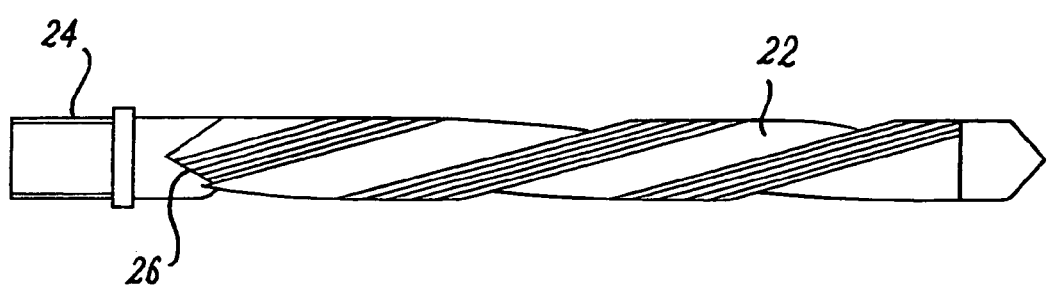
FIG. 2 shows a prior art drill bit.
Figure 3A:
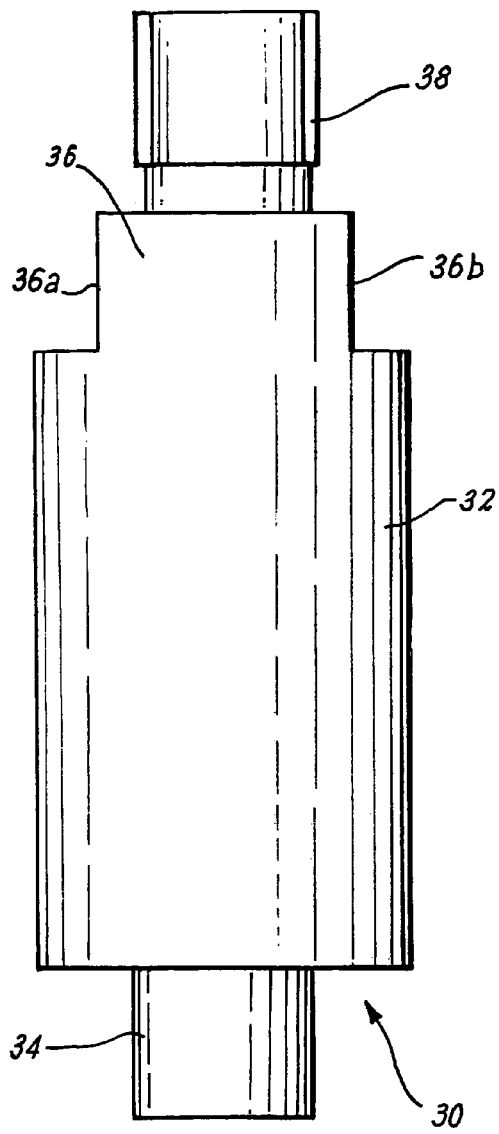
FIG. 3 shows (a) a plan view of a chuck and (b) a plan view with dotted lines depicting internal passageways of a chuck.
Figure 3B:
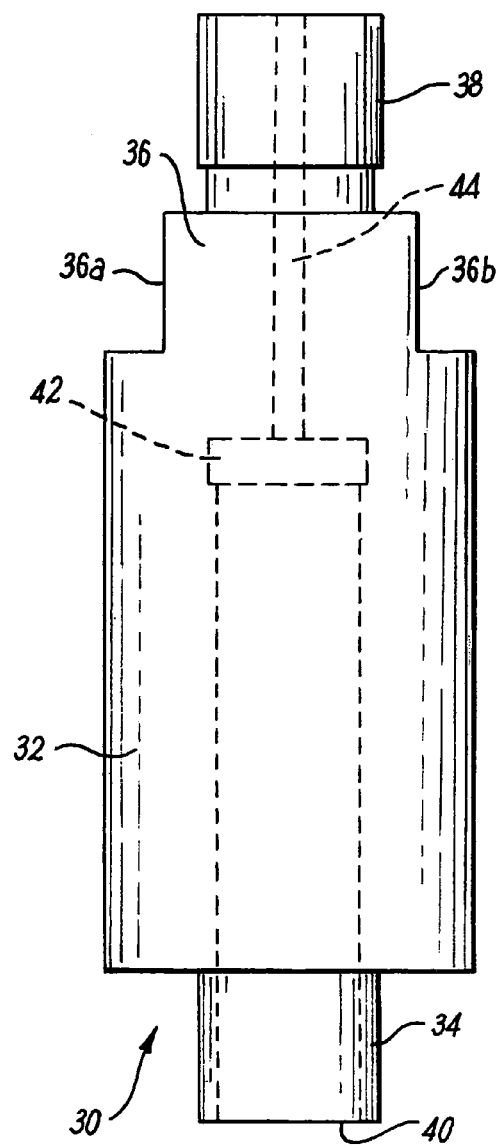
Figure 4:
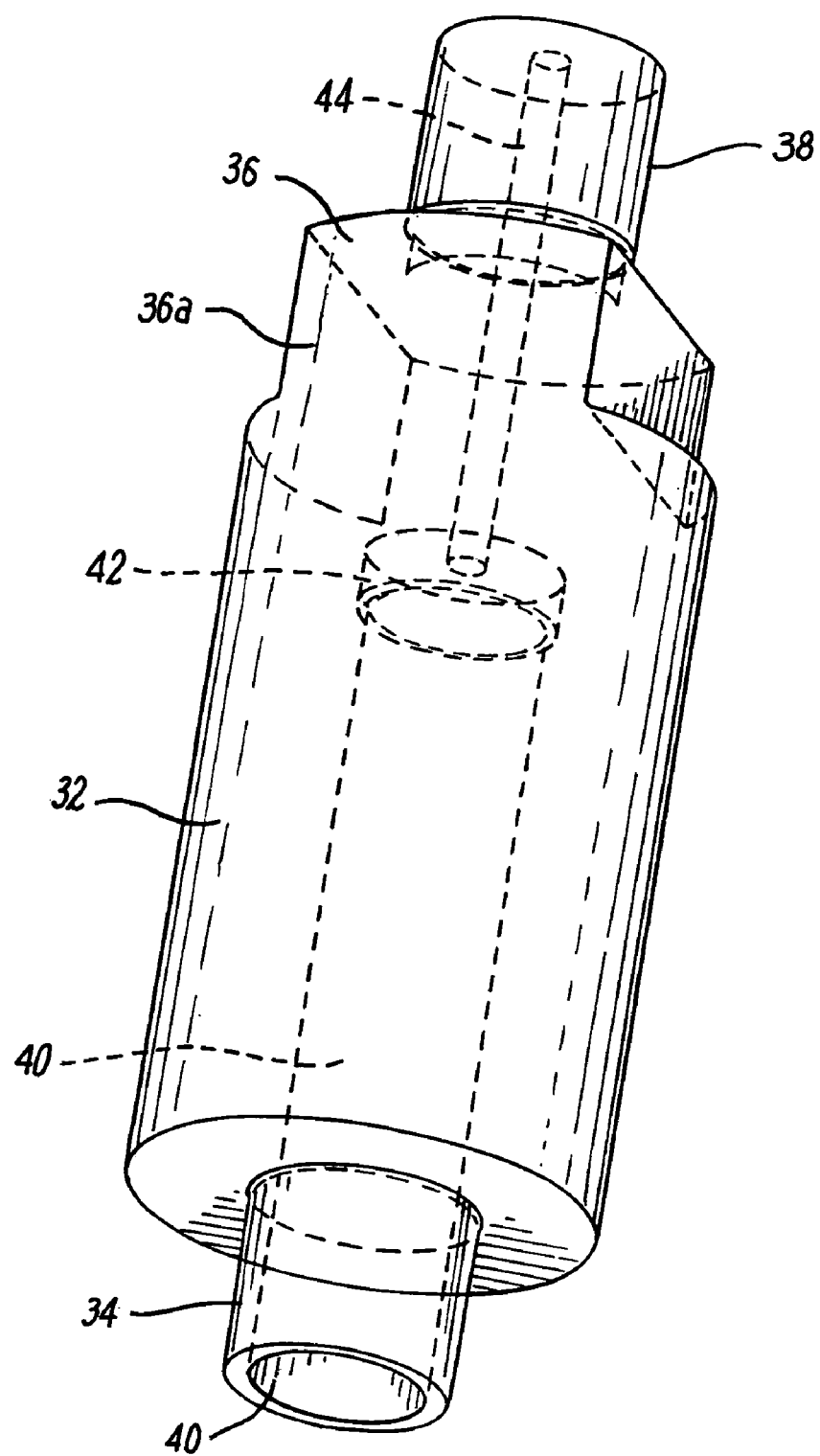
FIG. 4 shows a perspective view of a chuck showing with dotted lines internal passageways of the chuck.

FIGS. 3 and 4 show a chuck 30 of the invention. The chuck 30 comprises a cylindrical main section 32 having at one end thereof a tubular entrance portion 34 and at the other end thereof an end portion 36 having flat sides 36a, 36b enabling the convenient use of a tool such as a spanner to fix the chuck in place on a drill. The chuck 30 further comprises a cylindrical connector piece 38 having a thread (not shown) formed thereon. A bore 40 in the tubular entrance portion 34 extends into the body of the cylindrical main section 32: this bore is shaped so as to be able to receive the drill bit. A small chamber 42 of slightly larger radius than the radius of the bore 40 is located at the interior end of the bore 40. The purpose of the chamber 42 is to act as a reservoir for coolant. A conduit 44 extends between the chamber 42 and the upper surface of the connector piece 38. The conduit 44 allows coolant to pass into the chamber 42 from the drill. It is possible to utilise chucks in which the chamber 42 is absent. In such instances, the conduit communicates directly with the tubular bore, and the coolant reservoir is formed by way of leaving a gap between the interior end of the tubular bore and the drill bit. Additionally, it is possible to utilise chucks in which the tubular entrance portion 34 is absent: instead, the entrance to the bore 40 may be formed in the main section of the chuck.

Figure 5:
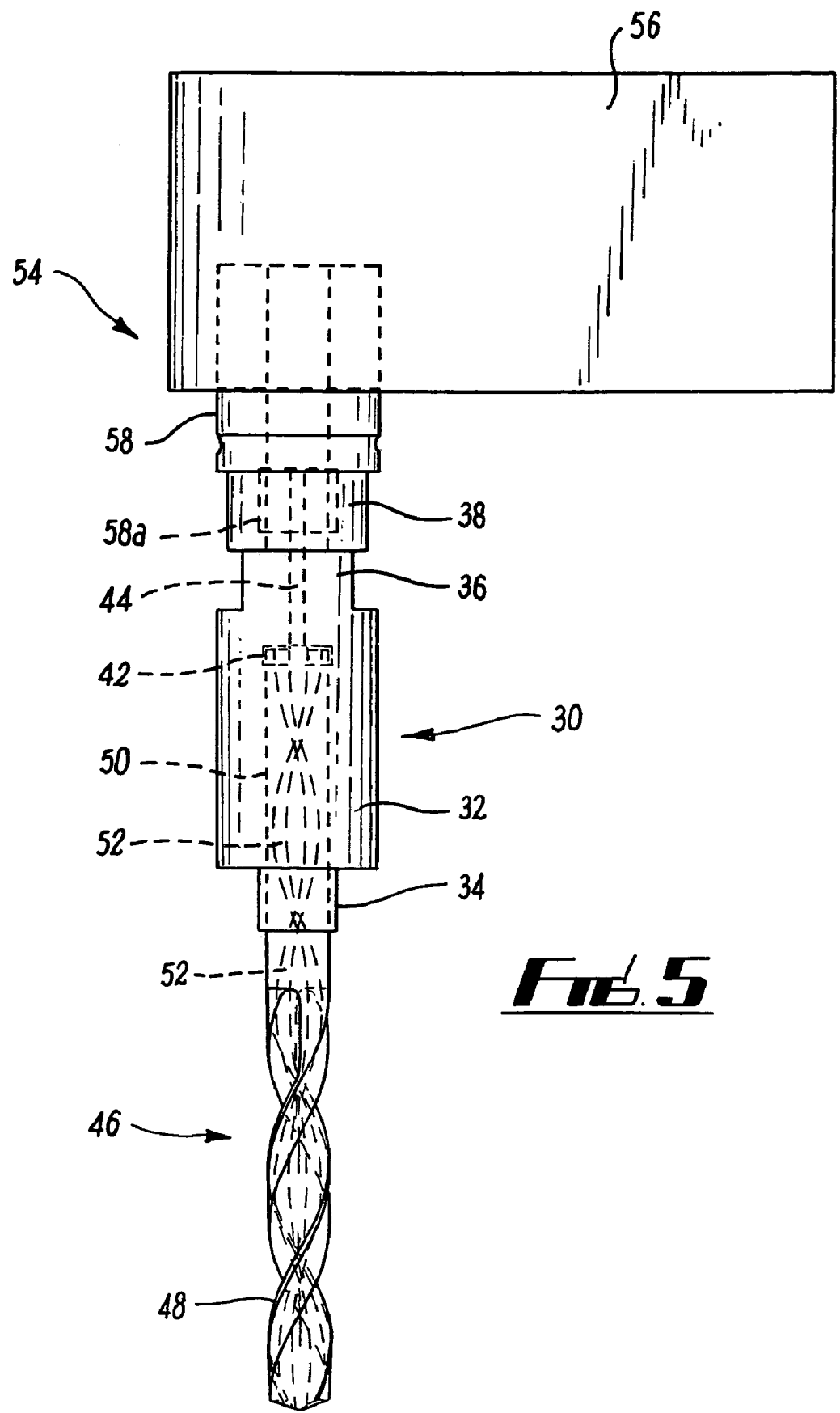
FIG. 5 shows an air drill incorporating a unitary drill bit and chuck structure showing with dotted lines internal passageways of the chuck.
Figure 6:
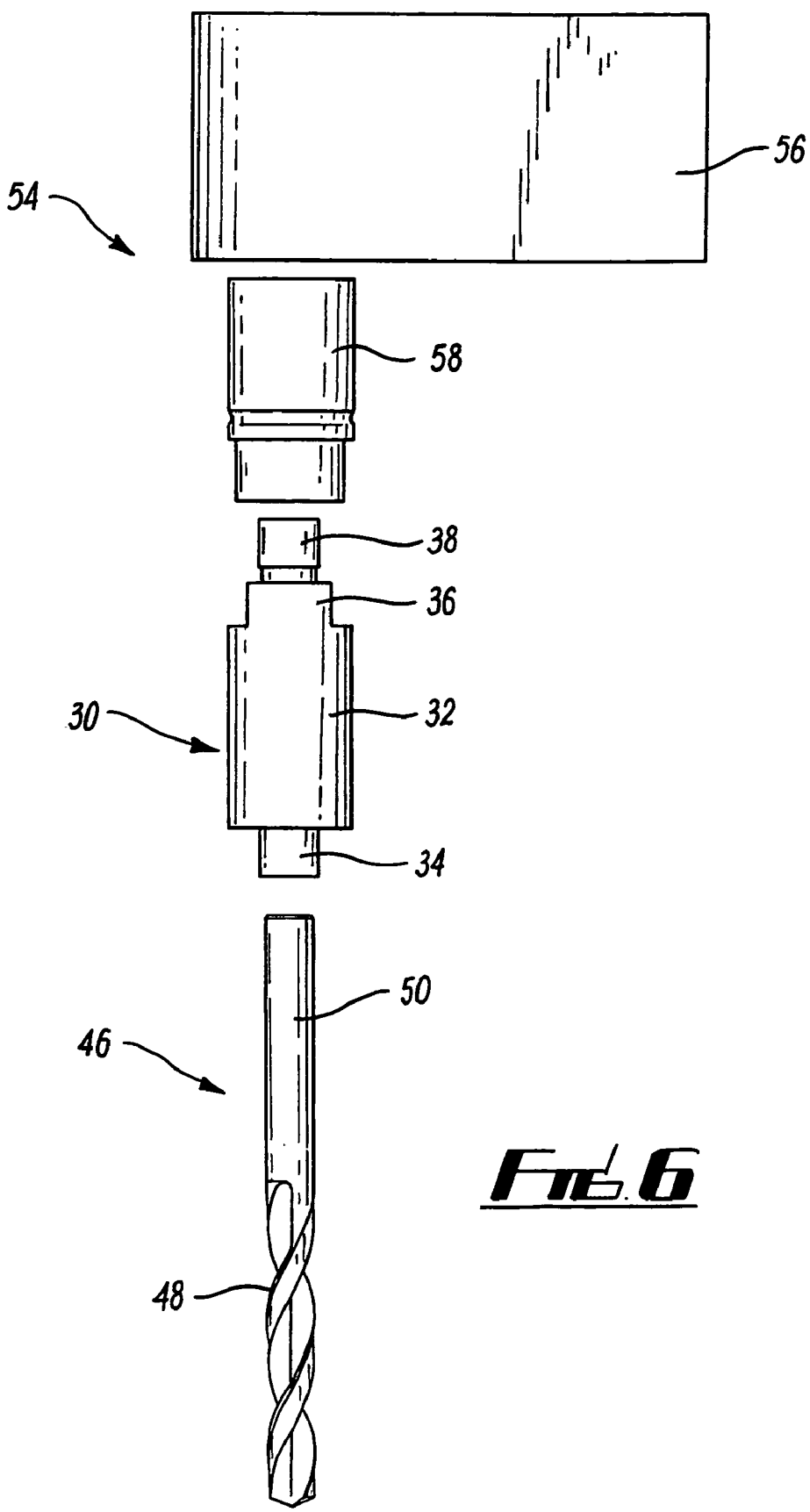
FIG. 6 shows an exploded view of the air drill of FIG. 5.
Figure 7:
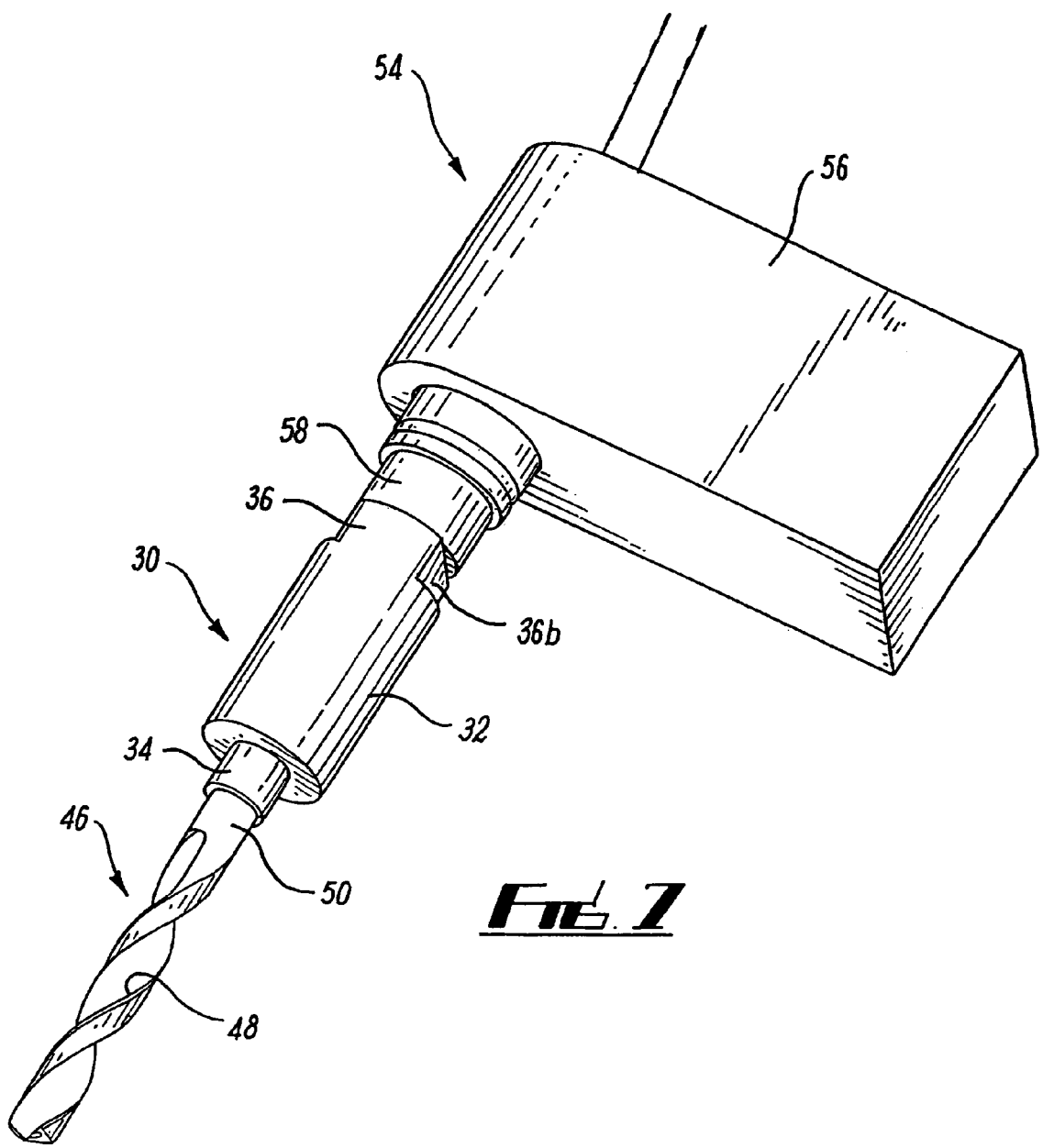
FIG. 7 shows a perspective view of the air drill of FIG. 5.

FIGS. 5, 6 and 7 show an air drill fitted with a unitary drill bit and chuck structure of the present invention. The unitary drill bit and chuck structure comprises a chuck 30 which is structurally identical to the chuck shown in FIGS. 3 and 4. Thus, identical numerals have been used to denote features which are shared between FIGS. 3 and 4, and FIGS. 5, 6 and 7. The unitary drill bit and chuck structure further comprises a drill bit 46. The drill bit 46 has cutting surfaces 48 and a shank portion 50, the shank portion 50 being in direct bonding contact with the chuck 30 through a process in which the chuck 30 is heat-shrunk onto the drill bit. The drill bit further comprises channels 52 through which coolant can flow (the coolant emanating from the chamber 42 which acts a coolant reservoir). The unitary drill bit and chuck structure is in threaded engagement with an air drill 54. For presentational purposes a simplified and partial representation of an air drill is provided in FIGS. 5, 6 and 7, showing an upper portion 56 comprising the air motor and gears (not shown) and a rotatable drive element 58 which is driven by the air motor acting through the gears. The rotatable drive element 58 has a threaded inner bore 58a onto which the cylindrical connector piece 38 of the chuck 30 is threaded. The drill bit 46 can be made from any suitable material, and it is an advantage of the present invention that very abrasive materials, such as carbides can be used. A further advantage of the invention is that the unitary drill bit and chuck structure can withstand high temperatures and thus can undergo coating processes such as diamond coating. In this way, it is possible to provide drill bit and chuck structures which are conveniently and easily compatible with portable air drills and which comprise very hard materials for cutting, such as tungsten carbide and/or diamond. The use of drill bits having diamond coatings in conjunction with hand-held air drills has not previously been possible.

The chuck may be manufactured from any suitable heat-shrinkable material. A preferred class of material is a precipitation hardening steel having a high thermal expansion coefficient (typically greater than or equal to $16.0 \times 10^{-6}$ per ° C. from 20° C. to 200° C.). A suitable class of material is sold under the trade name "GRIPER" by Uddeholm Tooling AB of Hagfors, Sweden. The unitary drill bit and chuck structure can be produced by a convenient heat shrinking process. Separate drill bits and chucks are manufactured using the principles set forth above. Typically, a chuck is heated to a pre-determined temperature, such as 200° C., the drill bit is inserted into the chuck, and the structure is allowed to cool in order to allow bonding of the chuck to the drill bit thereby to produce the unitary drill bit and chuck structure. Heat shrinking processes per se are well known, and equipment suitable for performing the heat shrinking operation are commercially available, an example being a heat shrinkage unit marketed under the name HOT SHOT Jr. SKT0699 by Streuli Technologies of Birmensdorf, Switzerland.

Numerous variations to the manufacturing process are within the ambit of the skilled person. For example, water or other coolant fluid may be used in order to speed up the cooling process. Furthermore, numerous variations are possible to the unitary drill bit and chuck structure, in terms of the precise design and configuration of the structure, and in terms of the materials used, providing that the materials are compatible with the heat shrinkage manufacturing process. For example, it may be possible to use another form of connector other than a threaded connection in order to attach the unitary drill bit and chuck structure to a handheld drill such as a handheld air drill. In this instance, it might be possible to dispense with the thread on the chuck, and instead utilise some other form of connector means to permit attachment of the unitary drill bit and chuck structure to a handheld drilling device. The unitary drill bit and chuck structures of the invention are not limited to use with handheld air driven drills although, as described above, considerable advantages accrue from such use. Rather, unitary drill bit and chuck structures might be used with any form of drill having provision for threaded attachment of a cutter for drilling, reaming and like purposes.

The invention claimed is:

1. A hand-held assembly for performing drilling or reaming operations on large objects utilized in the aeronautical industry, comprising:

a hand-held drilling device having a rotatable drive element with a threaded bore;

a drill bit having a shank portion and a helical cutting surface;

a chuck having a bore that receives the shank portion of the drill bit and having an external threaded connector portion located thereon that engages the threaded bore of the hand-held drilling device;

the chuck being heat shrunk onto the shank of the drill bit, thereby forming a unitary structure through direct bonding of the chuck with the drill bit;

an abrasive material applied to the cutting surface of the drill bit;

a chamber in the bore of the chuck;

a coolant passage extending through the threaded connector portion of the hand-held drilling device to the chamber for communicating a coolant from the hand-held drilling device to the chamber; and a coolant channel on the shank portion of the drill bit and extending from the chamber to the cutting surface for communicating the coolant to the cutting surface.

2. The hand-held assembly according to claim 1, further comprising a plurality of wrench flats formed on an exterior portion of the chuck for securing the chuck to the drilling device.

3. The hand-held assembly according to claim 1 in which the drill bit is formed from a carbide containing material.

4. The hand-held assembly according to claim 3 in which the drill bit is formed from tungsten carbide.

5. The hand-held assembly according to claim 1 in which the abrasive material comprises a diamond coating.

6. A hand-held drill for performing drilling or reaming operations on large objects utilized in the aeronautical industry, comprising:
    a unitary drill bit and chuck structure comprising a drill bit having a helical cutting surface coated with an abrasive material and a chuck having a bore enclosing a shank portion of the drill bit and having a connector portion containing an external thread located thereon, the drill bit having a coolant channel extending from the cutting surface to the shank portion within the bore of the chuck;
    a hand-held rotatable drive element having a thread located thereon; and
    drive means for rotating said rotatable drive element; wherein:
    said connector portion of said chuck is in threaded engagement with the thread of said rotatable drive element;
    the chuck is heat shrunk onto the shank portion of the drill bit, thereby forming the unitary structure through direct bonding of the chuck with the drill bit; and
    the chuck has a coolant passage extending from the rotatable drive element through the connector portion to the bore in communication with the coolant channel for communicating a coolant from the rotatable drive element device to the drill bit.

7. The hand-held drill according to claim 6 in which the drive means comprises an air motor, and the drill further comprises a pressurised air line for supplying pressurised air to the air motor.

8. A method of manufacturing a unitary drill bit and chuck structure for use with a hand-held drilling device comprising the steps of:
    providing a drill bit with a shank portion and a helical cutting surface;
    providing a chuck formed from a heat shrinkable material and forming a bore in the chuck;
    heating the chuck to a predetermined temperature;
    introducing the shank portion of the drill bit into the bore of the chuck;
    allowing the chuck to cool so as to heat shrink the chuck into direct bonding contact with the shank portion of the drill bit, thereby producing a unitary drill bit and chuck structure;
    providing an external thread on said chuck adapted to threadedly engage a hand-held drilling device;
    heating the unitary drill bit and chuck structure in order to apply an abrasive material to at least a portion of the cutting surface of the drill bit without damaging the bonding contact between the chuck and the drill bit responsive to the heat; and
    coating at least a portion of the cutting surface of the drill bit with the abrasive material.

9. The hand-held assembly according to claim 1, in which the bore defines a first diameter and the chamber defines a second diameter, the second diameter being larger than the first diameter, the chamber being co-axial with the bore.

10. The hand-held drill according to claim 6, further comprising:
    an enlarged diameter portion in the bore at the intersection of the coolant passage and the bore, the enlarged diameter portion being larger in diameter than the shank portion for communicating coolant from the coolant passage in the chuck to the coolant channel on the drill bit.

11. A hand-held assembly for performing drilling or reaming operations on large objects utilized in the aeronautical industry, comprising:
    a hand-held drilling device having a rotatable drive element with a threaded bore;
    a drill bit;
    a chuck enclosing a portion of the drill bit and having an external thread located thereon to permit attachment of said drill bit and chuck directly to the threaded bore of the hand-held drilling device;
    the chuck being heat shrunk onto the drill bit thereby forming a unitary structure through direct bonding of the chuck with the drill bit; and
    an abrasive material applied to the drill bit after the chuck is heat shrunk onto the drill bit.

12. The hand-held assembly according to claim 11, in which the chuck comprises a precipitation hardening steel.

13. The hand-held assembly according to claim 11, in which the drill bit is formed from a carbide containing material.

14. The hand-held assembly according to claim 13, in which the drill bit is formed from tungsten carbide.

15. The hand-held assembly according to claim 11, in which the drill bit is diamond coated.

* * * * *